(12) United States Patent
Calvin et al.

(10) Patent No.: US 9,600,434 B1
(45) Date of Patent: *Mar. 21, 2017

(54) SWITCH FABRIC HAVING A SERIAL COMMUNICATIONS INTERFACE AND A PARALLEL COMMUNICATIONS INTERFACE

(71) Applicant: Bedrock Automation Platforms Inc., San Jose, CA (US)

(72) Inventors: James G. Calvin, Attleboro, MA (US); Albert Rooyakkers, Sunnyvale, CA (US)

(73) Assignee: Bedrock Automation Platforms, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,998

(22) Filed: Aug. 26, 2016

Related U.S. Application Data

(63) Continuation of application No. 14/501,974, filed on Sep. 30, 2014, now Pat. No. 9,436,641, which is a
(Continued)

(51) Int. Cl.
*G06F 3/00* (2006.01)
*G06F 15/16* (2006.01)
(Continued)

(52) U.S. Cl.
CPC ........ *G06F 13/4022* (2013.01); *G06F 13/364* (2013.01); *G06F 13/4282* (2013.01); *G06F 15/17312* (2013.01)

(58) Field of Classification Search
CPC .............................. G06F 13/00; G06F 15/16
See application file for complete search history.

(56) References Cited

U.S. PATENT DOCUMENTS

| | | | |
|---|---|---|---|
| 4,628,308 A | 12/1986 | Robert | |
| 4,656,622 A * | 4/1987 | Lea | H04L 49/25 370/353 |

(Continued)

FOREIGN PATENT DOCUMENTS

EP   2317743 A1   5/2011

OTHER PUBLICATIONS

International Search Report and Written Opinion Dated Apr. 29, 2013, International Application No. PCT/US2012/072056.

*Primary Examiner* — Henry Tsai
*Assistant Examiner* — Christopher A Daley
(74) *Attorney, Agent, or Firm* — Advent, LLP

(57) ABSTRACT

A switch fabric is disclosed that includes a serial communications interface and a parallel communications interface. The serial communications interface is configured for connecting a plurality of slave devices to a master device in parallel to transmit information between the plurality of slave devices and the master device, and the parallel communications interface is configured for separately connecting the plurality of slave devices to the master device to transmit information between the plurality of slave devices and the master device, and to transmit information between individual ones of the plurality of slave devices. The parallel communications interface may comprise a dedicated parallel communications channel for each one of the plurality of slave devices. The serial communications interface may comprise a multidrop bus, and the parallel communications interface may comprise a cross switch.

19 Claims, 10 Drawing Sheets

Related U.S. Application Data continuation of application No. 13/341,161, filed on Dec. 30, 2011, now Pat. No. 8,862,802.

(51) Int. Cl.
*G06F 13/40* (2006.01)
*G06F 13/42* (2006.01)
*G06F 13/364* (2006.01)
*G06F 15/173* (2006.01)

(56) References Cited

U.S. PATENT DOCUMENTS

| | | | |
|---|---|---|---|
| 4,691,384 A | 9/1987 | Jobe | |
| 4,882,702 A | 11/1989 | Struger et al. | |
| 4,929,939 A | 5/1990 | Varma et al. | |
| 5,590,284 A * | 12/1996 | Crosetto | G06F 15/17368 710/104 |
| 5,602,754 A | 2/1997 | Beatty et al. | |
| 5,951,666 A | 9/1999 | Ilting et al. | |
| 6,680,904 B1 * | 1/2004 | Kaplan | H04L 12/56 370/217 |
| 6,812,803 B2 | 11/2004 | Goergen | |
| 6,988,162 B2 | 1/2006 | Goergen | |
| 7,200,692 B2 | 4/2007 | Singla et al. | |
| 7,254,452 B2 | 8/2007 | Davlin et al. | |
| 7,526,676 B2 | 4/2009 | Chou et al. | |
| 7,529,862 B2 | 5/2009 | Isani et al. | |
| 7,774,074 B2 | 8/2010 | Davlin et al. | |
| 8,266,360 B2 * | 9/2012 | Agrawal | G06F 13/423 710/305 |
| 8,310,380 B2 | 11/2012 | Aria et al. | |
| 8,380,905 B2 * | 2/2013 | Djabbari | G06F 13/4072 710/110 |
| 8,868,813 B2 | 10/2014 | Calvin et al. | |
| 9,465,762 B2 | 10/2016 | Calvin et al. | |
| 2002/0086678 A1 | 7/2002 | Salokannel et al. | |
| 2002/0171525 A1 | 11/2002 | Kobayashi et al. | |
| 2003/0202330 A1 | 10/2003 | Lopata et al. | |
| 2007/0076768 A1 | 4/2007 | Chiesa et al. | |
| 2008/0123669 A1 | 5/2008 | Oliveti et al. | |
| 2008/0194124 A1 | 8/2008 | Di Stefano | |
| 2009/0245245 A1 | 10/2009 | Malwankar et al. | |
| 2010/0052428 A1 | 3/2010 | Imamura et al. | |
| 2011/0296066 A1 | 12/2011 | Xia | |
| 2012/0284354 A1 | 11/2012 | Mukundan et al. | |
| 2012/0297101 A1 | 11/2012 | Neupartl et al. | |

* cited by examiner

```
┌─────────────────────────────────────────────────────────┐
│  1010  CONNECT SLAVE DEVICES TO A MASTER DEVICE IN      │
│  PARALLEL FOR TRANSMITTING INFORMATION BETWEEN THE      │
│       SLAVE DEVICES AND THE MASTER DEVICE               │
│  ┌───────────────────────────────────────────────────┐  │
│  │ 1012  CONNECT THE SLAVE DEVICES TO THE MASTER     │  │
│  │           DEVICE USING A MULTIDROP BUS            │  │
│  └───────────────────────────────────────────────────┘  │
└─────────────────────────────────────────────────────────┘
                             │
┌─────────────────────────────────────────────────────────┐
│  1020  SEPARATELY CONNECT THE SLAVE DEVICES TO THE      │
│   MASTER DEVICE FOR TRANSMITTING INFORMATION BETWEEN    │
│    THE SLAVE DEVICES AND THE MASTER DEVICE, AND FOR     │
│       TRANSMITTING INFORMATION BETWEEN INDIVIDUAL       │
│                ONES OF THE SLAVE DEVICES                │
│  ┌───────────────────────────────────────────────────┐  │
│  │ 1022  CONNECT THE SLAVE DEVICES TO THE MASTER     │  │
│  │           DEVICE USING A CROSS SWITCH             │  │
│  └───────────────────────────────────────────────────┘  │
└─────────────────────────────────────────────────────────┘
                             │
┌─────────────────────────────────────────────────────────┐
│   1030  CONNECT THE SLAVE DEVICES TO A SECOND MASTER    │
│                   DEVICE IN PARALLEL                    │
└─────────────────────────────────────────────────────────┘
                             │
┌─────────────────────────────────────────────────────────┐
│  1040  SEPARATELY CONNECT THE SLAVE DEVICES TO THE      │
│               SECOND MASTER DEVICE                      │
└─────────────────────────────────────────────────────────┘
```

SWITCH FABRIC HAVING A SERIAL COMMUNICATIONS INTERFACE AND A PARALLEL COMMUNICATIONS INTERFACE

BACKGROUND

One of the most common communication architectures is the multidrop serial communication bus. A Multidrop Bus (MDB) is a bus in which various components are connected to a common set of electrical connectors. This type of bus architecture typically uses a master device and multiple slave devices that communicate with the master device. An arbitration process is used to determine which component can send information on the MDB at a given instant in time. The other devices are then configured to listen for the data that is intended for them. Peripheral Component Interconnect (PCI) is one type of computer bus multidrop standard, used for attaching hardware devices in a computer. Multidrop buses may also be used with vending machine controllers to communicate with vending machine components, such as coin readers and/or note readers. Redundant multidrop buses can be used to prevent a single failure from interrupting communication between the master device and the slave devices. For example, dual multidrop bus configurations can be used in distributed control systems.

SUMMARY

A switch fabric is disclosed. In one or more implementations, the switch fabric includes a serial communications interface and a parallel communications interface. The serial communications interface is configured to connect a plurality of slave devices to a master device in parallel to transmit information between the plurality of slave devices and the master device. In implementations, the serial communications interface may comprise a multidrop bus. The parallel communications interface is configured to separately connect the plurality of slave devices to the master device to transmit information between the plurality of slave devices and the master device, and to transmit information between individual ones of the plurality of slave devices. The parallel communications interface may comprise a dedicated parallel communications channel for each one of the plurality of slave devices. In implementations, the parallel communications interface may comprise a cross switch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 10 is a flow diagram illustrating a process for furnishing communication between multiple slave devices and one or more master devices in accordance with example implementations of the present disclosure.

DETAILED DESCRIPTION

Overview

Figure 1:
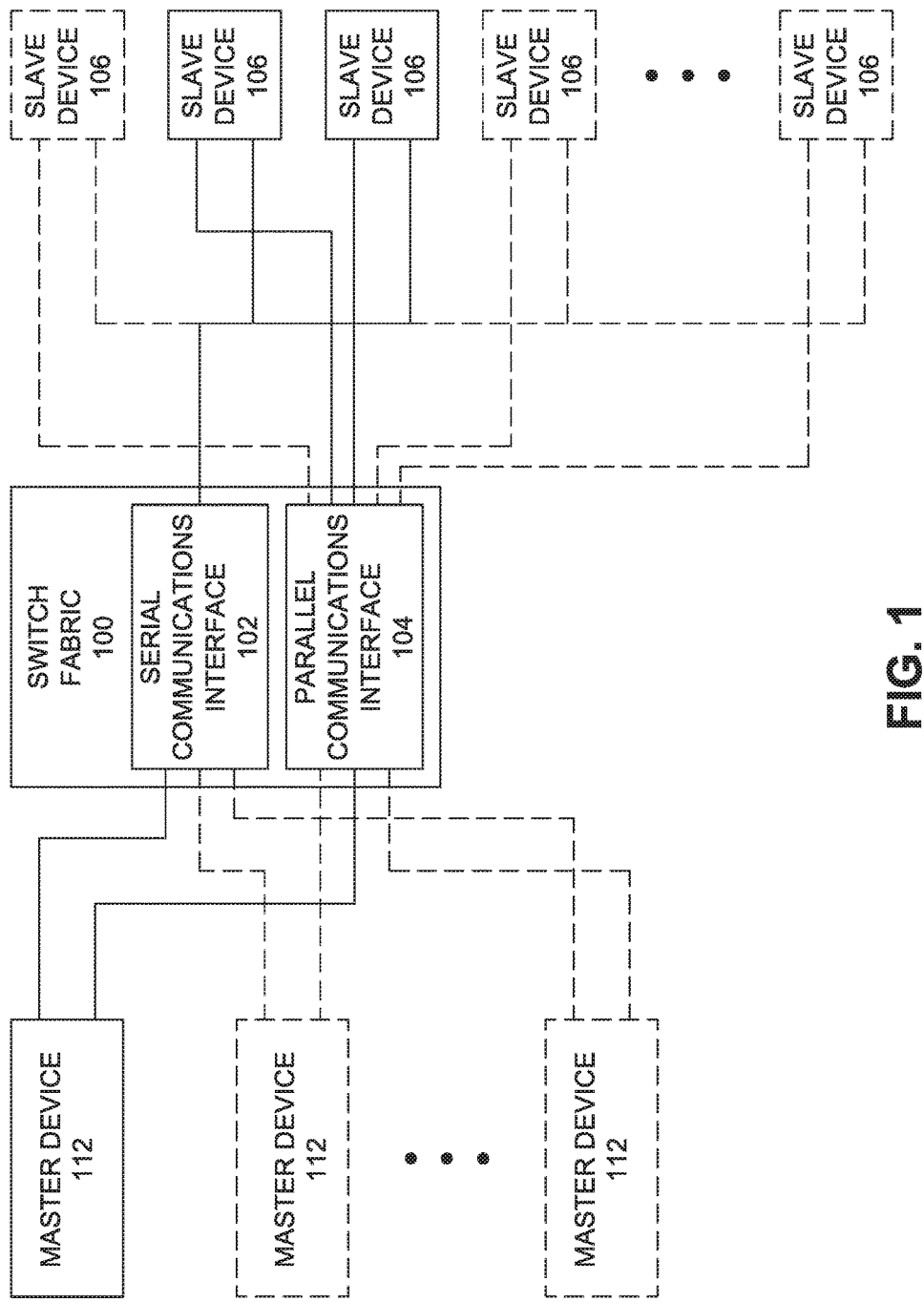
FIG. 1 is a block diagram illustrating a switch fabric in accordance with example implementations of the present disclosure.

In a typical multidrop bus configuration, the master device communicates with the slave devices by polling each slave device one at a time. However, as the number of slave devices increases, the turnaround time for communication increases as well. For example, the total communication turnaround time for a multidrop bus is equal to the sum of each of the times for the master device to send a command to a slave device and receive a response from the slave device, and is thus proportional to the number of slave devices on the network. For high speed control systems applications with many slave devices, this can make communication too slow to be useful. Additionally, this type of bus is half-duplex, and communication between the slave devices further slows the bus and requires complex collision detection. This not only makes the bus slower, but causes the system to be nondeterministic with respect to communication turnaround times, making such a configuration unsuitable for control systems.

Accordingly, a switch fabric is described that has a serial communications interface (e.g., a serial or Multidrop Bus (MDB) with a master device and multiple slave devices) and a parallel communications interface (e.g., a parallel or point-to-point bus implemented using a cross switch, or the like). A switch fabric configured in accordance with the present disclosure may increase communication response time over a standard multidrop architecture. The switch fabric may also provide deterministic communication (e.g., with respect to communication turnaround time) between a master device and slave devices, as well as between the slave devices themselves. Further, the switch fabric may eliminate communication collisions between a master device and the slave devices, as well as eliminating collisions between the slave devices themselves.

In some implementations, the serial communications interface and the parallel communications interface may be formed on a single printed circuit board. The serial communications interface may be configured for connecting the plurality of slave devices to a second master device in parallel, and the parallel communications interface may be configured for separately connecting the plurality of slave devices to the second master device. Information transmitted via the serial communications interface and/or the parallel communications interface may be packetized. The switch fabric may comprise a network interface for transmitting information collected from the plurality of slave devices via a network, and so forth.

A switch assembly is also described that includes a multidrop bus for connecting a plurality of slave devices to a master device in parallel to transmit information between the plurality of slave devices and the master device. The switch assembly also includes a cross switch for separately connecting the plurality of slave devices to the master device to transmit information between the plurality of slave devices and the master device, and to transmit information between individual ones of the plurality of slave devices.

Example Implementations

Figure 2:
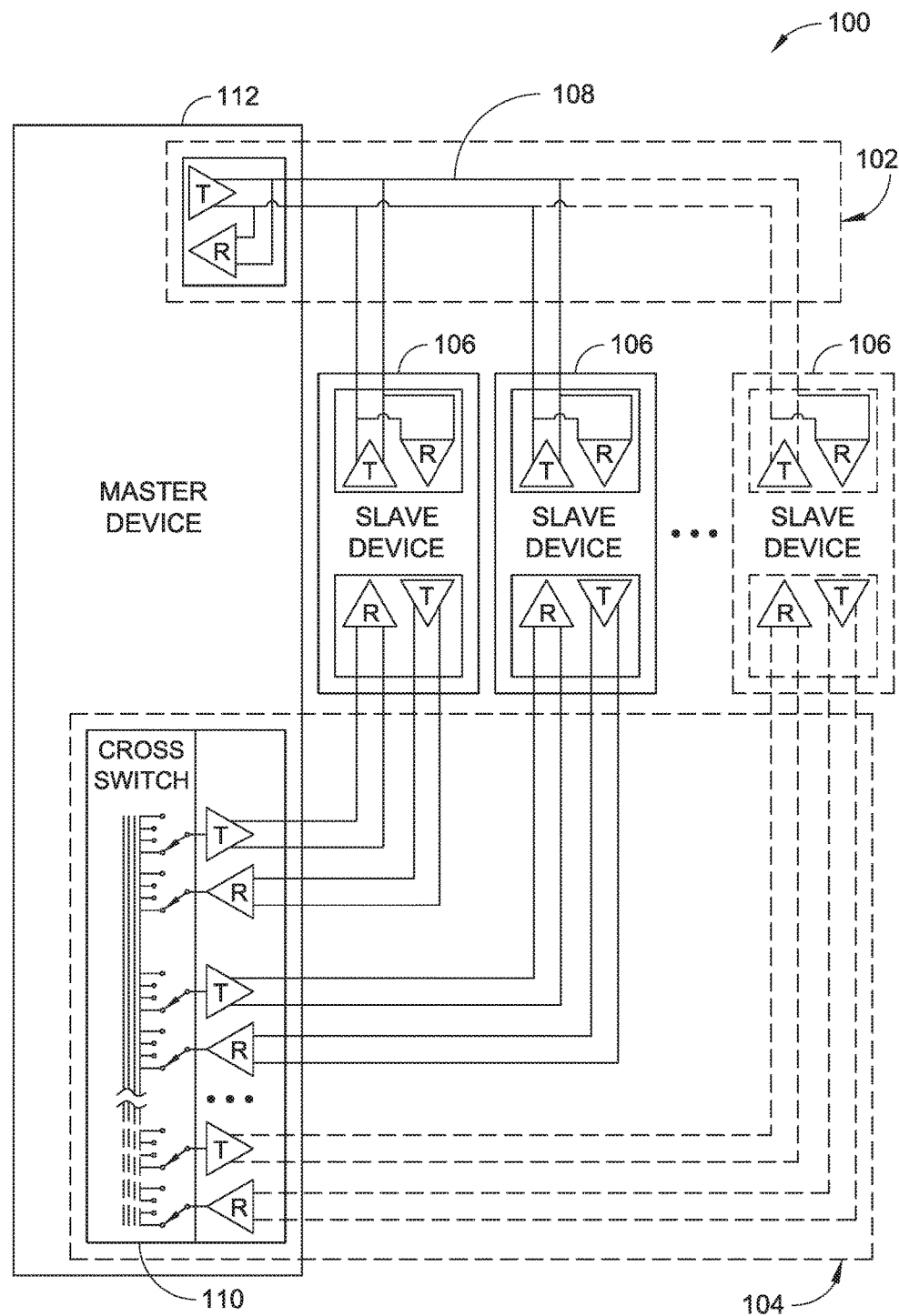
FIG. 2 is a circuit diagram illustrating a switch fabric in accordance with example implementations of the present disclosure.

FIGS. 1 and 2 illustrate an example switch fabric 100 in accordance with example implementations of the present disclosure. In implementations, the switch fabric 100 may be configured for use with any systems technology, such as telecommunications network technology, computer network technology, process control systems technology, and so forth. For example, the switch fabric 100 may be used with a distributed control system comprised of controller elements and subsystems, where the subsystems are controlled by one or more controllers distributed throughout the system. The switch fabric 100 includes a serial communications interface 102 and a parallel communications interface 104 for furnishing communications with a number of slave devices 106. The serial communications interface 102 may be implemented using a group of connectors connected in parallel with one another. For example, the serial communications interface 102 may be implemented using a multidrop bus 108, or the like. In implementations, the multidrop bus 108 may be used for configuration and diagnostic functions of the slave devices 106.

The parallel communications interface 104 allows multiple signals to be transmitted simultaneously over multiple dedicated high speed parallel communication channels. For instance, the parallel communications interface 104 may be implemented using a cross switch 110, or the like. In a particular implementation, as described in FIG. 2, the parallel communications interface 104 can be implemented using a four (4) wire full duplex cross switch 110 with a dedicated connection to each slave device 106. For example, the cross switch 110 can be implemented as a programmable cross switch connecting point-to-point busses and allowing traffic between the slave devices 106.

The cross switch 110 may be configured by a master device 112. For example, the master device 112 may configure one or more sets of registers included in the cross switch 110 to control traffic between the slave devices 106. In implementations, a master device 112 may comprise a rule set dictating how the slave devices 106 are interconnected. For example, a master device 112 may comprise a set of registers, where each register defines the operation of a particular switch (e.g., with respect to how packets are forwarded, and so forth). Thus, the cross switch 110 may not necessarily auto-configure, instead implementing a configuration provided by the master device 112. However, this configuration is provided by way of example only and is not meant to be restrictive of the present disclosure. Thus, in other implementations, the cross switch 110 may auto-configure.

The parallel communications interface 104 may be used for data collection from the slave devices 106. Further, because each slave device 106 has its own private bus to the master (e.g., master device 112), each slave device 106 can communicate with the master at the same time. Thus, the total response time for the switch fabric 100 may be limited to that of the slowest slave device 106, instead of the sum of all slave devices, as previously discussed in relation to a typical multidrop bus.

In implementations, the switch fabric 100, the serial communications interface 102, and the parallel communications interface 104 may be implemented in a single, monolithic circuit board. However, this configuration is provided by way of example only and is not meant to be restrictive of the present disclosure. Thus, the serial communications interface 102 and the parallel communications interface 104 may be implemented using different arrangements of multiple components, such as multiple discrete semiconductor devices for implementing the serial communications interface 102 and the parallel communications interface 104 separately, and so forth.

Referring now to FIGS. 3 through 9, a communications control system 114 using switch fabric 100 is described. The switch fabric 100 may be configured for connecting one or more I/O modules 116 as slave devices and transmitting data to and from the I/O modules 116. The I/O modules 116 may comprise input modules, output modules, and/or input and output modules. For instance, input modules can be used to receive information from input instruments in the process or the field, while output modules can be used to transmit instructions to output instruments in the field. For example, an I/O module 116 can be connected to a process sensor, such as a sensor 118 for measuring pressure in piping for a gas plant, a refinery, and so forth. In implementations, the I/O modules 116 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, the I/O module 116 may be configured to convert analog data received from the sensor 118 to digital data (e.g., using Analog-to-Digital Converter (ADC) circuitry, and so forth). An I/O module 116 may also be connected to a motor 120 and configured to control one or more operating characteristics of the motor 120, such as motor speed, motor torque, and so forth. Further, the I/O module 116 may be configured to convert digital data to analog data for transmission to the motor 120 (e.g., using Digital-to-Analog (DAC) circuitry, and so forth). In implementations, one or more of the I/O modules 116 may comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the I/O modules 116 can be used to provide fault tolerant and redundant connections for a communications sub-bus.

Each I/O module 116 may be provided with a unique identifier (ID) for distinguishing one I/O module 116 from another I/O module 116. In implementations, an I/O module 116 may be identified by its ID when it is connected to the communications control system 114. Multiple I/O modules 116 can be used with the communications control system 114 to provide redundancy. For example, two or more I/O modules 116 can be connected to the sensor 118 and/or the motor 120, as described in FIG. 3. Each I/O module 116 can include one or more ports 122 furnishing a physical connection to hardware and circuitry included with the I/O module 116, such as a Printed Circuit Board (PCB) 124, and so forth.

One or more of the I/O modules 116 may include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 116 may include a connection for connecting an I/O module 116 to a computer bus, and so forth.

The switch fabric 100 may be coupled with one or more communications/control modules 126, which can be used as master devices for monitoring and controlling the I/O modules 116, and for connecting the I/O modules 116 together. The communications/control module(s) 126 may be used to configure the cross switch 110. For example, the communications/control module 126 may update a routing table when an I/O module 116 is connected to the communications control system 114 based upon a unique ID for the I/O module 116. Further, when multiple redundant I/O modules 116 are used, each communications/control module 126 can implement mirroring of informational databases regarding the I/O modules 116 and update them as data is received from and/or transmitted to the I/O modules 116. In some implementations, two or more communications/control modules 126 may be used to provide redundancy.

Data transmitted using the switch fabric 100 may be packetized, i.e., discrete portions of the data may be converted into data packets comprising the data portions along with network control information, and so forth. The switch fabric 100 may use one or more protocols for data transmission, including a bit-oriented synchronous data link layer protocol such as High-Level Data Link Control (HDLC). In a specific instance, the switch fabric 100 may implement HDLC according to an International Organization for Standardization (ISO) 13239 standard, or the like. Further, two or more communications/control modules 126 can be used to implement redundant HDLC. However, it should be noted that HDLC is provided by way of example only and is not meant to be restrictive of the present disclosure. Thus, the communications control system 114 may use other various communications protocols in accordance with the present disclosure.

One or more of the communications/control modules 126 may be configured for exchanging information with components used for monitoring and/or controlling the instrumentation connected to the switch fabric 100 via the I/O modules 116, such as one or more control loop feedback mechanisms/controllers 128. In implementations, a controller 128 can be configured as a microcontroller/Programmable Logic Controller (PLC), a Proportional-Integral-Derivative (PID) controller, and so forth. One or more of the communications/control modules 126 may include a network interface 130 for connecting the communications control system 114 to a controller 128 via a network 132. In implementations, the network interface 130 may be configured as a Gigabit Ethernet interface for connecting the switch fabric 100 to a Local Area Network (LAN). Further, two or more communications/control modules 126 can be used to implement redundant Gigabit Ethernet. However, it should be noted that Gigabit Ethernet is provided by way of example only and is not meant to be restrictive of the present disclosure. Thus, the network interface 130 may be configured for connecting the communications control system 114 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 130 may be implemented using computer bus. For example, the network interface 130 can include a Peripheral Component Interconnect (PCI) card interface, such as a Mini PCI interface, and so forth. Further, the network 132 may be configured to include a single network or multiple networks across different access points.

Figure 3:
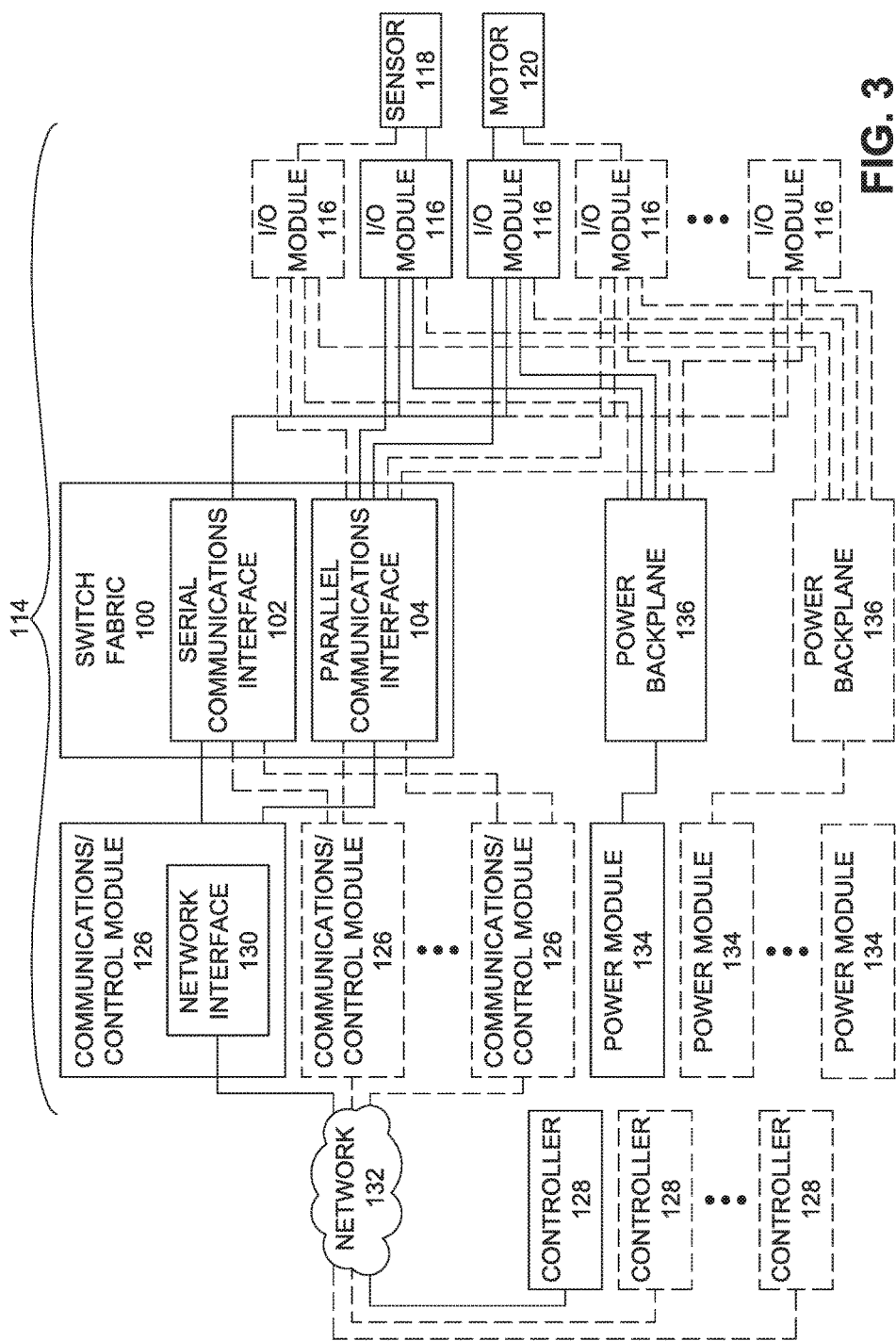
FIG. 3 is a block diagram illustrating a communications control system comprising a switch fabric in accordance with example implementations of the present disclosure.
Figure 4:
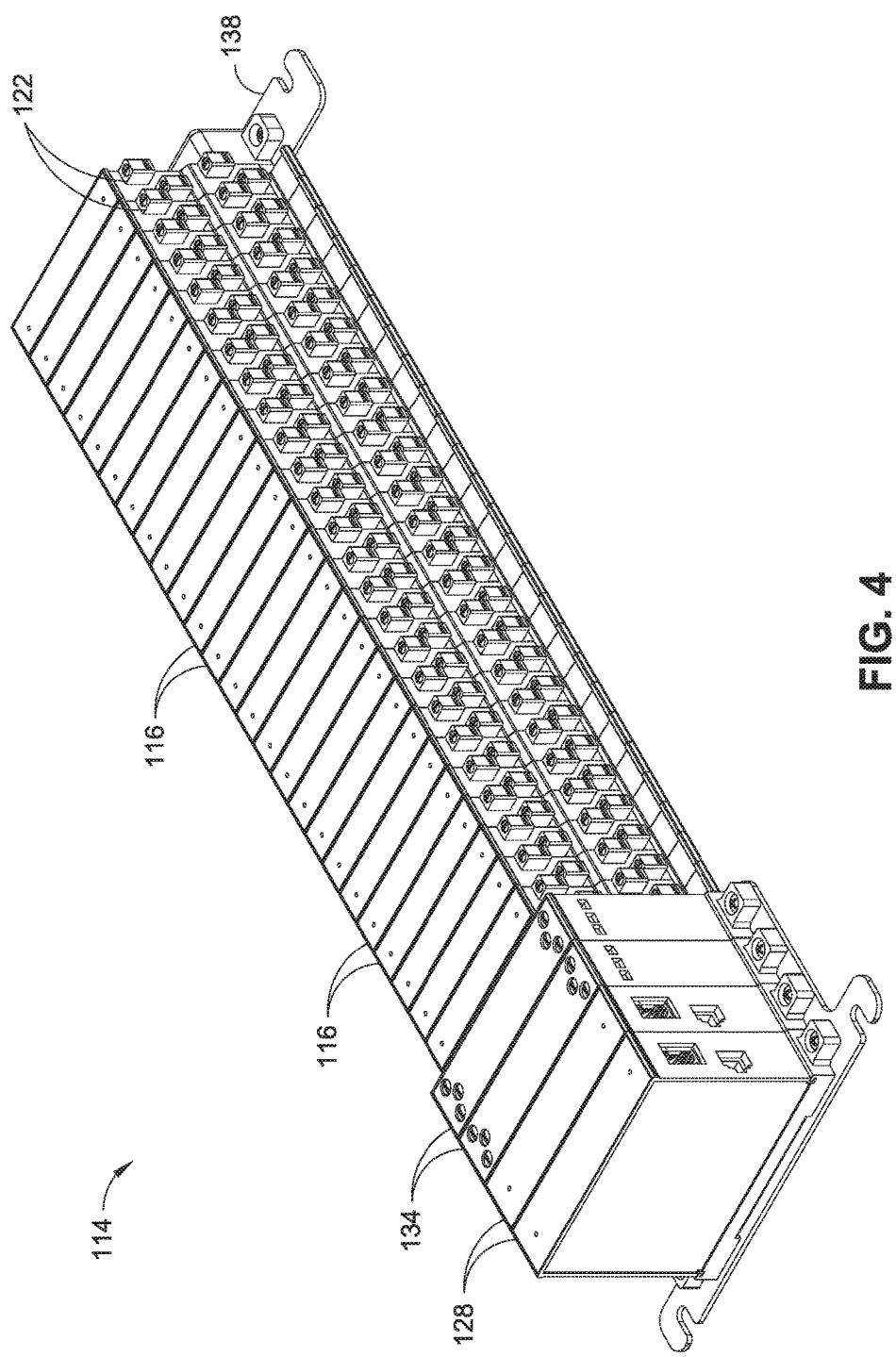
FIG. 4 is an isometric view illustrating a communications control system comprising a switch fabric in accordance with example implementations of the present disclosure.
Figure 5:
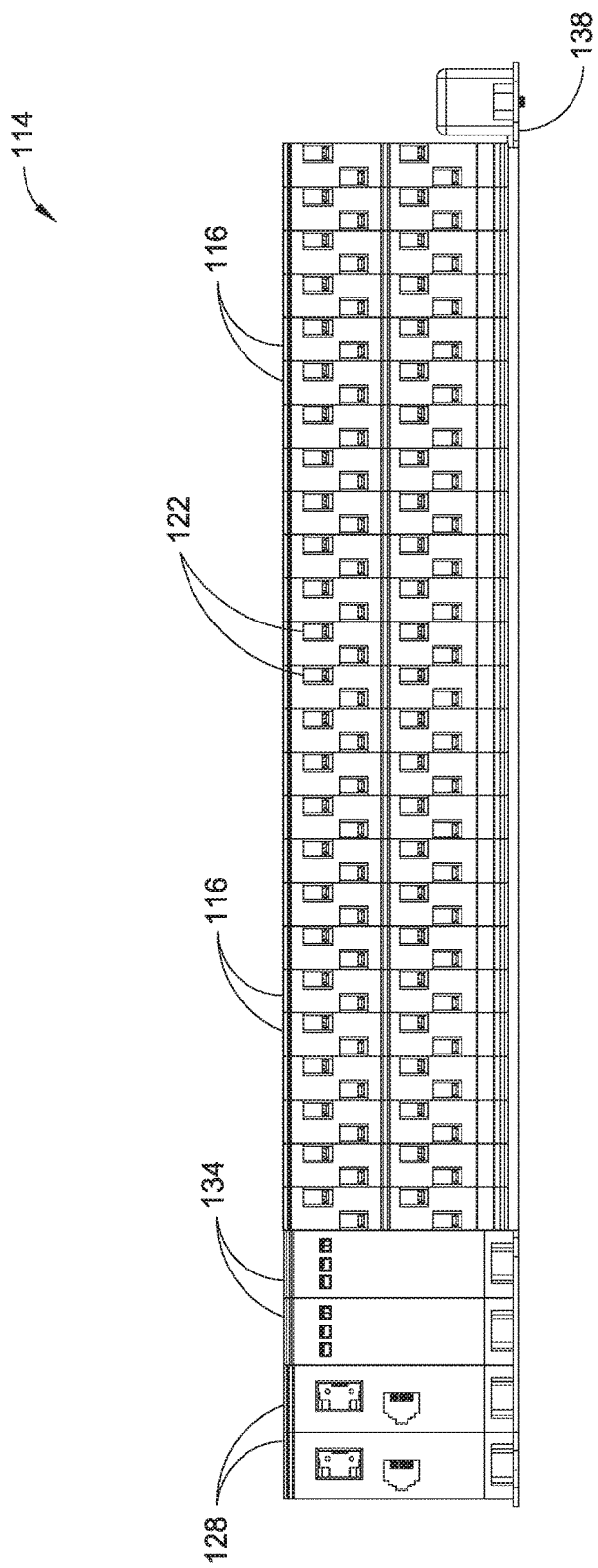
FIG. 5 is a side elevation view of the communications control system illustrated in FIG. 4.
Figure 6:
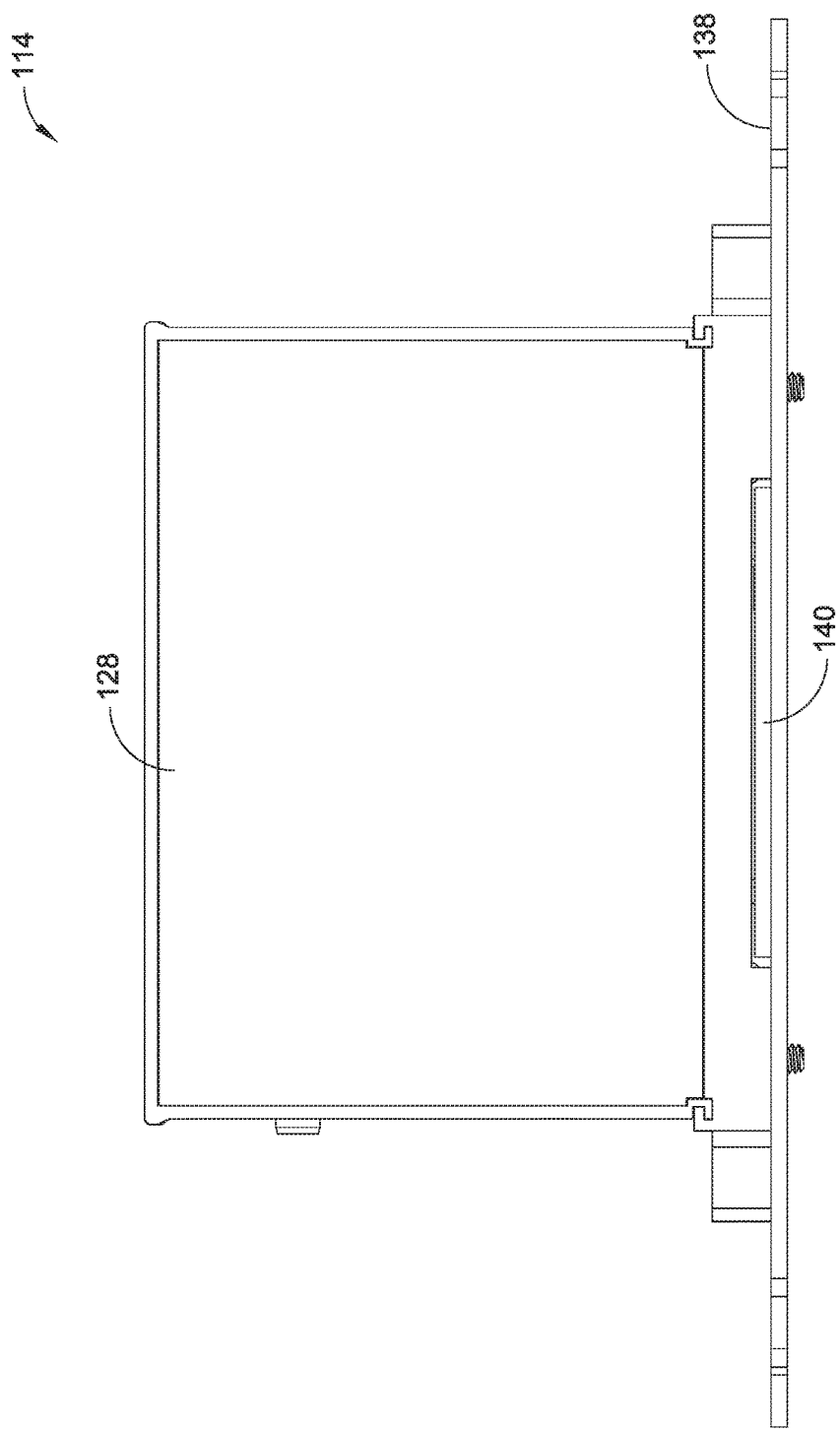
FIG. 6 is an end view of the communications control system illustrated in FIG. 4.
Figure 7:
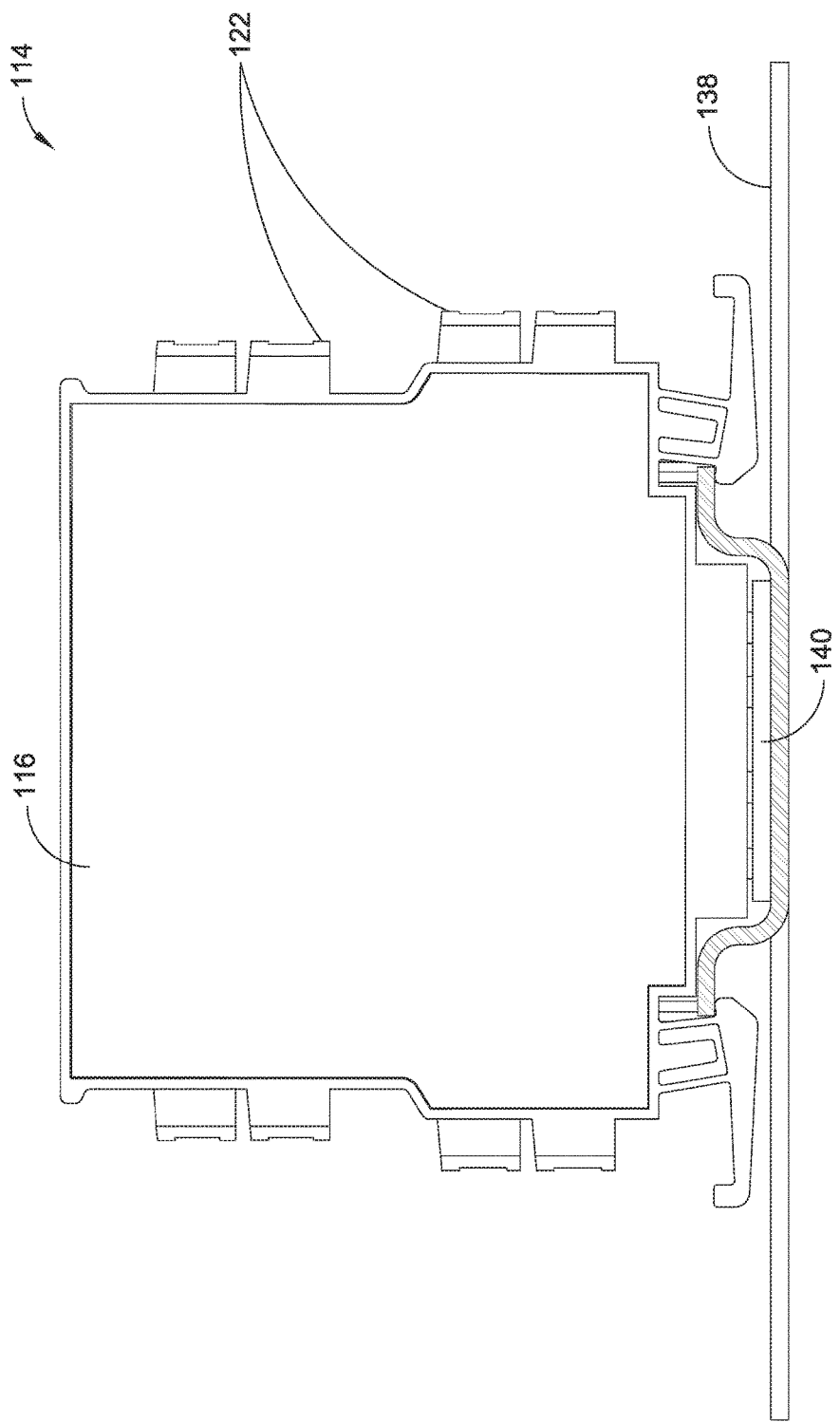
FIG. 7 is a partial cross-sectional end view of the communications control system illustrated in FIG. 4.
Figure 8:
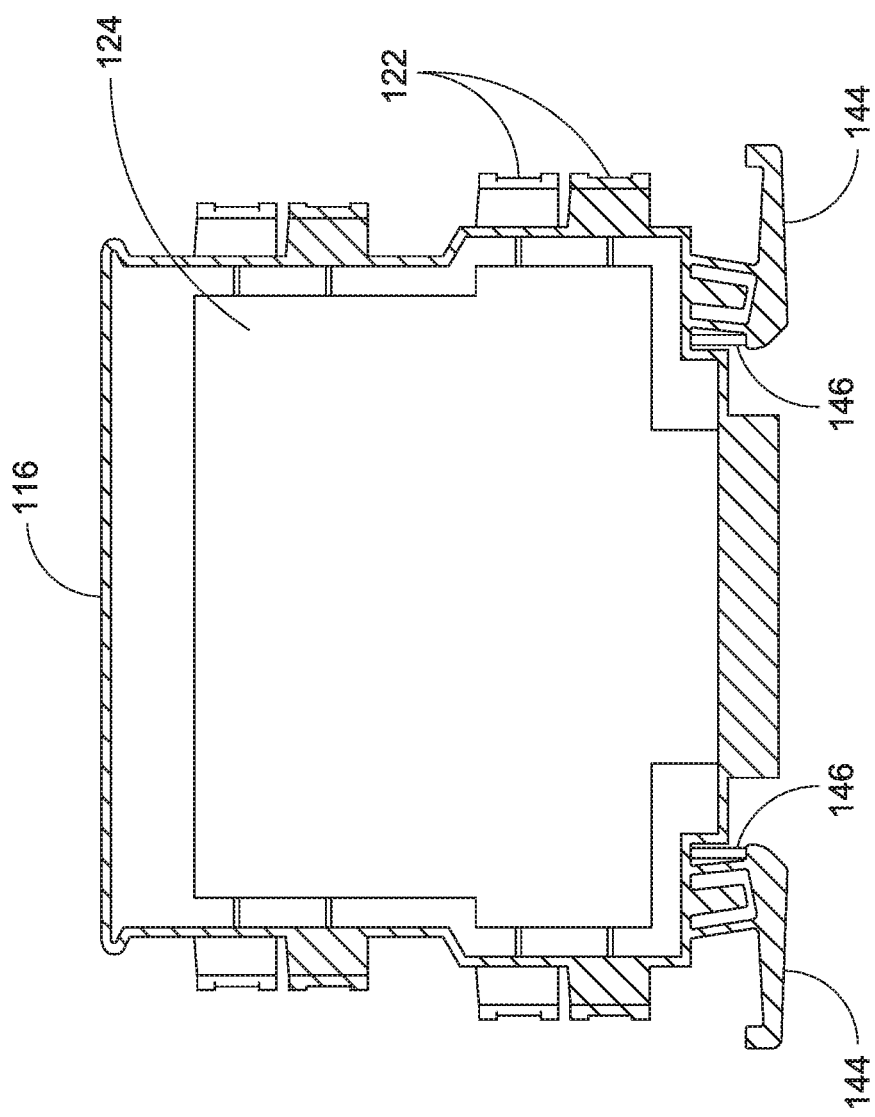
FIG. 8 is a cross-sectional view illustrating an input/output module for the communications control system illustrated in FIG. 4.
Figure 9:
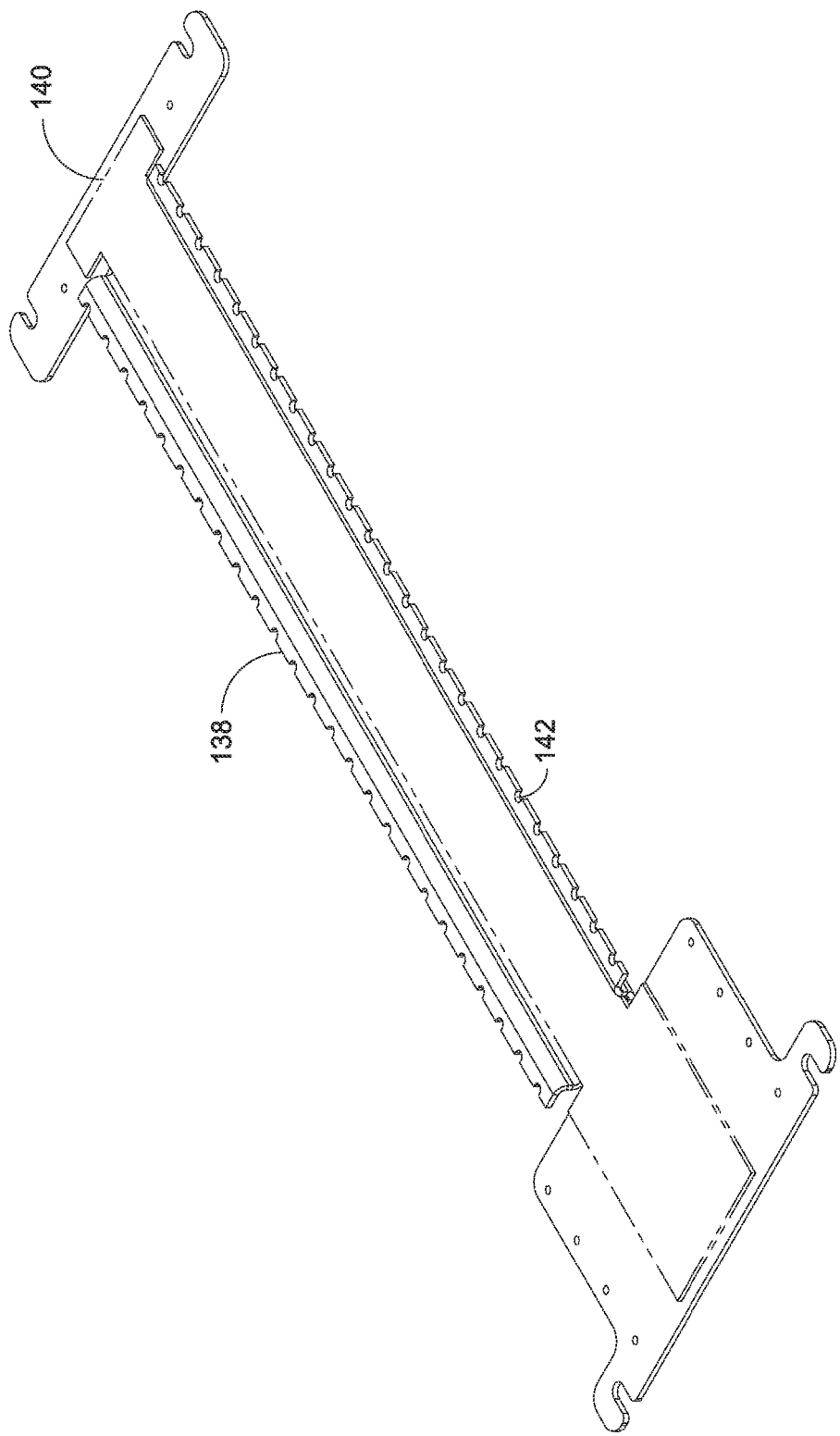
FIG. 9 is an isometric view illustrating a support frame for the communications control system illustrated in FIG. 4.

The communications control system 114 may include one or more power modules 134 for supplying electrical power to field devices via the I/O modules 116. One or more of the power modules 134 may include an AC-to-DC (AC/DC) converter for converting Alternating Current (AC) (e.g., as supplied by AC mains, and so forth) to Direct Current (DC) for transmission to a field device, such as the motor 120 (e.g., in an implementation where the motor 120 comprises a DC motor). Two or more power modules 134 can be used to provide redundancy. For example, as shown in FIG. 3, two power modules 134 can be connected to each of the I/O modules 116 using a separate power backplane 136 for each power module 134.

The communications control system 114 may be implemented using a support frame 138. The support frame 138 may be used to support and/or interconnect the communications/control module(s) 126, the power module(s) 134, the switch fabric 100, the power backplane(s) 136, and/or the I/O modules 116. For example, the switch fabric 100 may be comprised of a circuit board 140, which may be mounted to the support frame 138 using a fastener, such as, for example, double sided tape, adhesive, or mechanical fasteners (screws, bolts, etc.). The support frame 138 may include slots 142 to provide registration for the I/O modules 116, such as for aligning connectors of the I/O modules 116 with connectors included with the circuit board 140 and/or connectors of a power backplane 136. For example, an I/O module 116 may include connectors 144 having tabs/posts 146 for inserting into slots 142 and providing alignment of the I/O module 116 with respect to the circuit board 140. In implementations, one or more of the connectors 144 may be constructed from a thermally conductive material (e.g., metal) connected to a thermal plane of PCB 124 to conduct heat generated by components of the PCB 124 away from the PCB 124 and to the support frame 138, which itself may be constructed of a thermally conductive material (e.g., metal). Further, the communications control system 114 may associate a unique physical ID with each physical slot 142 to uniquely identify each I/O module 116 coupled with a particular slot 142. For example, the ID of a particular slot 142 can be associated with an I/O module 116 coupled with the slot 142 and/or a second ID uniquely associated with the I/O module 116. Further, the ID of a particular I/O module 116 can be used as the ID for a slot 142 when the I/O module 116 is coupled with the slot 142. The support frame 138 can be constructed for cabinet mounting, rack mounting, wall mounting, and so forth.

Example Process

Referring now to FIG. 10, example techniques for furnishing communication between multiple slave devices and one or more master devices using a switch fabric that includes a serial communications interface and a parallel communications interface are described.

FIG. 10 depicts a process 1000, in an example implementation, for furnishing a switch fabric, such as the switch fabric 100 illustrated in FIGS. 1 through 9 and described above. In the process 1000 illustrated, slave devices are connected to a master device in parallel for transmitting information between the slave devices and the master device (Block 1010). In one or more implementations, the slave devices can be connected to the master device using a multidrop bus (Block 1012). For example, with reference to FIG. 2, the serial communications interface 102 of the switch fabric 100 may be implemented using a multidrop bus 108. The slave devices are separately connected to the master device for transmitting information between the slave devices and the master device, and for transmitting information between individual ones of the slave devices (Block 1020). In one or more implementations, the slave devices can be separately connected to the master device using a cross switch (Block 1022). For instance, with continuing reference to FIG. 2, the parallel communications interface 104 of the switch fabric 100 may be implemented using a cross switch 110 comprising a four (4) wire full duplex system with a dedicated connection to each slave device 106.

In some implementations, the slave devices can be connected to a second master device in parallel (Block 1030). The slave devices can also be separately connected to the second master device (Block 1040). For example, with continuing reference to FIGS. 1 through 9, two or more communications/control modules 126 can be used to implement a redundant HDLC data link layer protocol. It should be noted that connecting the slave devices to a second master device is provided by way of example only and is not meant to be restrictive of the present disclosure. Thus, the slave devices may be connected to more than two master devices in parallel and/or separately.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A switch fabric for an industrial control system, the switch fabric comprising:
   a serial communications interface for connecting a plurality of slave devices to a master device in parallel, the serial communications interface configured for transmitting information between the plurality of slave devices and the master device; and
   a parallel communications interface for separately connecting the plurality of slave devices to the master device, the parallel communications interface configured for transmitting information between the plurality of slave devices and the master device, and transmitting information between individual ones of the plurality of slave devices, each one of the plurality of slave devices identifying itself to the master device using a unique identification upon connecting to the master device, the master device maintaining a routing table with the unique identification for each slave device connected to the master device, the unique identification comprising at least one of an identifier associated with the slave device or an identifier associated with a slot that provides registration for the slave device.

2. The switch fabric as recited in claim 1, wherein the parallel communications interface comprises a dedicated parallel communications channel for each one of the plurality of slave devices.

3. The switch fabric as recited in claim 1, wherein the serial communications interface comprises a multidrop bus.

4. The switch fabric as recited in claim 1, wherein the parallel communications interface comprises a cross switch.

5. The switch fabric as recited in claim 1, wherein the serial communications interface and the parallel communications interface are formed on a single printed circuit board.

6. The switch fabric as recited in claim 1, wherein the serial communications interface is configured for connecting the plurality of slave devices to a second master device in parallel, and the parallel communications interface is configured for separately connecting the plurality of slave devices to the second master device.

7. The switch fabric as recited in claim 1, wherein information transmitted via at least one of the serial communications interface or the parallel communications interface is packetized.

8. The switch fabric as recited in claim 1, further comprising a network interface for transmitting information collected from the plurality of slave devices via a network.

9. A process comprising:
   connecting a plurality of slave devices to a master device in an industrial control system in parallel for transmitting information between the plurality of slave devices and the master device;
   separately connecting the plurality of slave devices to the master device in the industrial control system for transmitting information between the plurality of slave devices and the master device, and transmitting information between individual ones of the plurality of slave devices;
   establishing a routing table;
   identifying each one of the plurality of slave devices to the master device using a unique identification upon connecting to the master device; and
   maintaining the routing table with the unique identification for each slave device connected to the master device, the unique identification comprising at least one of an identifier associated with the slave device or an identifier associated with a slot that provides registration for the slave device.

10. The process as recited in claim 9, wherein separately connecting the plurality of slave devices to the master device comprises furnishing a dedicated parallel communications channel for each one of the plurality of slave devices.

11. The process as recited in claim 9, wherein connecting the plurality of slave devices to the master device in parallel comprises connecting the plurality of slave devices to the master device using a multidrop bus.

12. The process as recited in claim 9, wherein separately connecting the plurality of slave devices to the master device comprises separately connecting the plurality of slave devices to the master device using a cross switch.

13. The process as recited in claim 9, wherein connecting the plurality of slave devices to the master device in parallel and separately connecting the plurality of slave devices to the master device comprises connecting the plurality of slave devices to the master device using a single printed circuit board.

14. The process as recited in claim 9, further comprising:
connecting the plurality of slave devices to a second master device in parallel; and
separately connecting the plurality of slave devices to the second master device.

15. The process as recited in claim 9, wherein at least one of transmitting information between the plurality of slave devices and the master device or transmitting information between individual ones of the plurality of slave devices comprises packetizing the transmitted information.

16. A switch assembly for an industrial control system, the switch assembly comprising:

a multidrop bus for connecting a plurality of slave devices to a plurality of master devices in parallel, the multidrop bus configured for transmitting information between the plurality of slave devices and the plurality of master devices; and a cross switch for separately connecting the plurality of slave devices to the plurality of master devices, the cross switch configured for transmitting information between the plurality of slave devices and the plurality of master devices, and transmitting information between individual ones of the plurality of slave devices, the plurality of master devices each maintaining a mirrored routing table, wherein the mirrored routing tables are updated with the unique identification for each slave device connected to the master device.

17. The switch assembly as recited in claim 16, wherein the multidrop bus and the cross switch are formed on a single printed circuit board.

18. The switch assembly as recited in claim 16, wherein information transmitted via at least one of the multidrop bus or the cross switch is packetized.

19. The switch assembly as recited in claim 16, further comprising a network interface for transmitting information collected from the plurality of slave devices via a network.

* * * * *